UNITED STATES PATENT OFFICE.

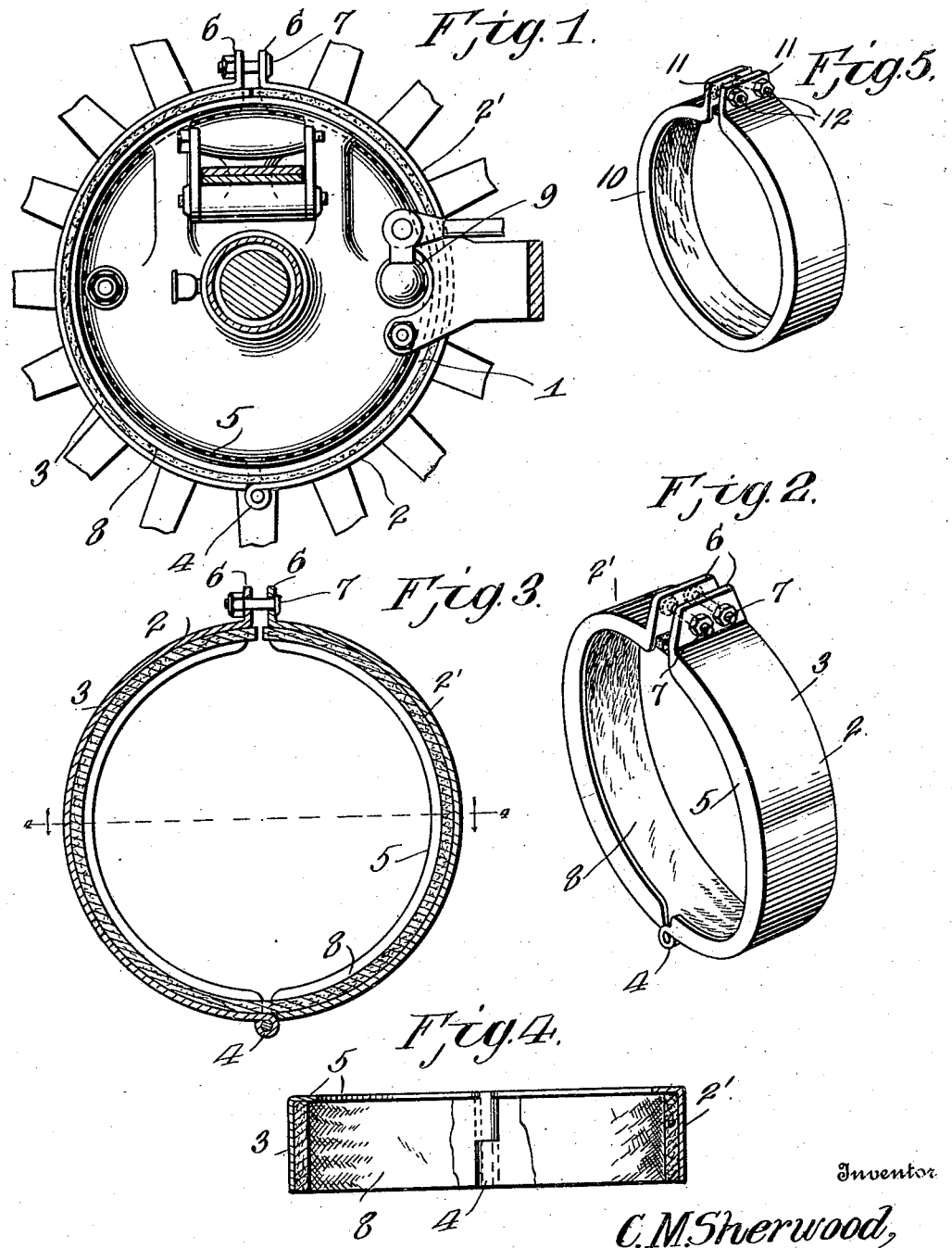

CHARLES M. SHERWOOD, OF ARMONK, NEW YORK.

GREASE-SHIELD.

1,250,035. Specification of Letters Patent. Patented Dec. 11, 1917.

Application filed December 15, 1914. Serial No. 877,417.

*To all whom it may concern:*

Be it known that I, CHARLES M. SHERWOOD, a citizen of the United States, residing at Armonk, in the county of Westchester and State of New York, have invented new and useful Improvements in Grease-Shields, of which the following is a specification.

The present invention relates to shields for protecting the rear wheels of automobiles from oil or grease dripping upon the spokes, rim and tire of said wheels from the drum in which the emergency or other brake band is closed, and the object of the invention is to provide a device of this character which is of an extremely simple construction, which may be easily applied and which shall be thoroughly efficient for the purpose designed.

With the above and other objects in view, the improvement resides in the construction, combination and arrangement of parts set forth in the following specification and falling within the scope of the appended claim.

In the drawing:

Figure 1 is a view illustrating the device applied,

Fig. 2 is a perspective view of the device,

Fig. 3 is a central vertical longitudinal sectional view through the same, and

Fig. 4 is a horizontal section.

Fig. 5 is a view of a modified form of the device.

In the drawing, the drum which closes the improvement is illustrated in applied position around the emergency brake band of a Ford automobile, for which the said device is primarily adapted, but the same can, with alterations which will not interfere with the novelty of the structure, be applied to automobiles of other makes.

In the drawings, the numeral 1 designates the drum of the emergency brake band of an automobile, and 2 the improvement. The improvement comprises a circular or ring member which is preferably constructed of comparatively thin metal and comprises two sections, 2' and 3 respectively which are hingedly secured, as at 4. The members 2' and 3 are each provided with an outer inwardly extending annular flange 5, and the meeting ends of the sections 2' and 3, opposite their hinge 4 are provided with outturned portions or lips 6—6 which receive a securing element 7, whereby the sections are retained in locked position. Arranged upon the inner surface of the ring member 2 is a flat annular split washer 8, the same being preferably formed from felt or any other suitable absorbent material.

The device is attached to, as illustrated in the drawings, and projects a slight but suitable distance beyond drum 1, so that the grease or oil dripping from the emergency brake will be absorbed by the felt washer 8 and prevented by the flange 5 from contacting with the spokes, rim or tire of the rear wheel of the machine.

In Fig. 5 I have illustrated a device substantially similar to that previously described, the same including a circular split ring member 10 constructed from a single sheet of suitable resilient material and having its ends outturned to provide ears 11, a securing element 12 connecting the said ears to sustain the member in proper position.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

A grease shield, for the drums of emergency brake bands of automobiles, comprising two substantially semi-circular comparatively thin metal bands which are hingedly connected at one of their ends, their opposite ends formed with outturned lips, and one of their edges, between the lips and the hinge connections of the members, provided with an annular inturned flange, a flat annular split compressible member in the shield and having one of its edges contacting with the flanges of the shield, and means, comprising adjustable elements passing through openings in the lips, whereby to retain the hinge sections adjusted with respect to each other.

In testimony whereof I affix my signature in presence of two witnesses.

CHARLES M. SHERWOOD.

Witnesses:
NILES S. HOPKINS,
EDWIN F. ACKER.

Copies of this patent may be obtained for five cents each, by addressing the "Commissioner of Patents, Washington, D. C."